(12) United States Patent
Martinez Revaliente

(10) Patent No.: US 12,006,906 B2
(45) Date of Patent: Jun. 11, 2024

(54) METHOD AND DEVICE FOR THE CAPTURE OF WAVE POWER

(71) Applicant: GADES WAVES SL, Cádiz (ES)

(72) Inventor: Santiago Martinez Revaliente, Cádiz (ES)

(73) Assignee: GADE WAVES SL, Cádiz (ES)

( * ) Notice: Subject to any disclaimer, the term of this patent is extended or adjusted under 35 U.S.C. 154(b) by 0 days.

(21) Appl. No.: 18/023,240

(22) PCT Filed: Mar. 3, 2021

(86) PCT No.: PCT/ES2021/000009
§ 371 (c)(1),
(2) Date: Feb. 24, 2023

(87) PCT Pub. No.: WO2022/043591
PCT Pub. Date: Mar. 3, 2022

(65) Prior Publication Data
US 2023/0250792 A1 Aug. 10, 2023

(30) Foreign Application Priority Data
Aug. 28, 2020 (ES) ............................... ES202000128

(51) Int. Cl.
*F03B 13/18* (2006.01)
(52) U.S. Cl.
CPC ................... *F03B 13/18* (2013.01)
(58) Field of Classification Search
CPC .... F03B 13/18; F03B 13/186; F03B 13/1845; F05B 2250/72; F05B 2260/4021; F05B 2260/4031; F05B 2260/5032; F05B 2270/202; Y02E 10/30
See application file for complete search history.

(56) References Cited

U.S. PATENT DOCUMENTS

| 1,864,499 | A | * | 6/1932 | Grigsby | ................ | F03B 13/186 60/507 |
| 4,599,858 | A | | 7/1986 | La Stella et al. | | |
| 6,020,653 | A | * | 2/2000 | Woodbridge | ....... | F03B 13/1865 60/495 |
| 2011/0225964 | A1 | | 9/2011 | Welch, Jr. | | |
| 2012/0235413 | A1 | * | 9/2012 | Piccinini | ............. | F03B 13/1865 290/53 |

FOREIGN PATENT DOCUMENTS

| WO | 2016120599 A1 | 4/2016 |
| WO | 2020012453 A1 | 1/2020 |

* cited by examiner

*Primary Examiner* — Hoang M Nguyen
(74) *Attorney, Agent, or Firm* — Hayes Soloway PC

(57) ABSTRACT

This invention discloses a method and a device for the capture of wave power, exploiting the maximum potential energy of each wave, based on obtaining the maximum imbalance possible between the Thrust Force and the Weight acting upon the capture elements on the passage of each wave, slowing and releasing them both at their high points and at their low points by means of the use of blocking systems, maximizing the submerged and emerged volumes of the next movement, likewise the travel during which the capture elements are accelerated due to the exploitation of their kinetic energy and their release in the transmission of efforts at the moments when the points of equilibrium between the rising and falling maximums are reached, thus generating an increase in the potential energy captured.

15 Claims, 11 Drawing Sheets

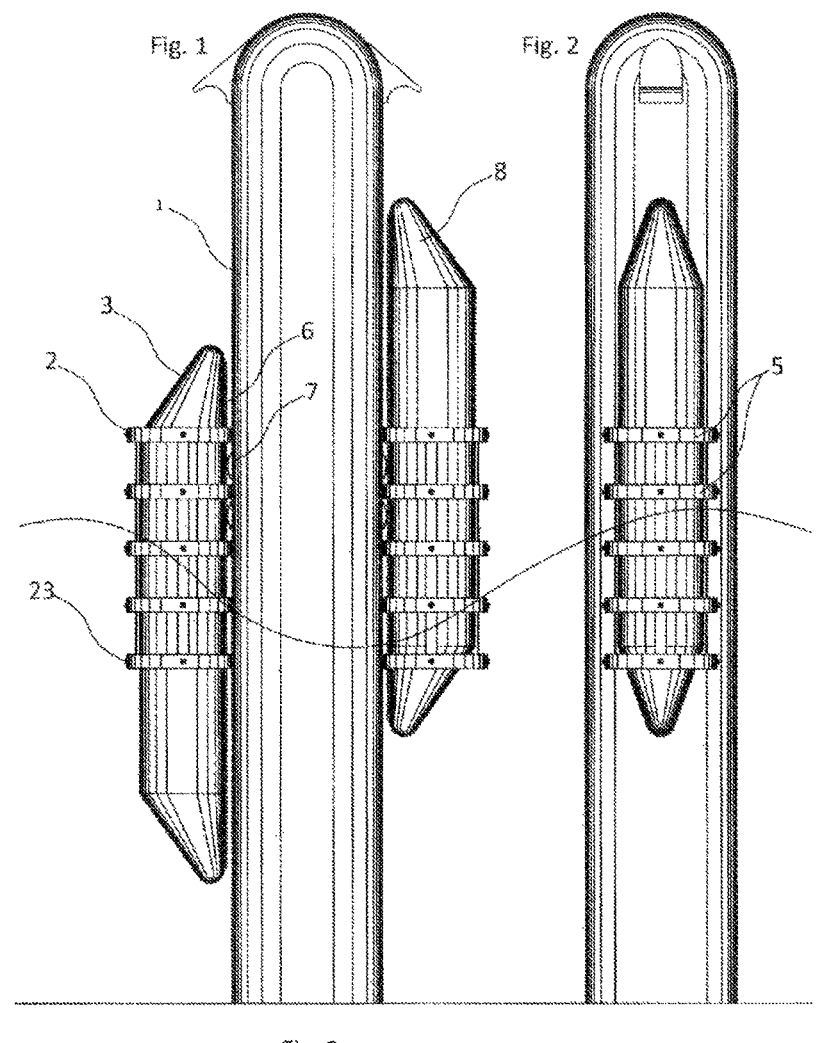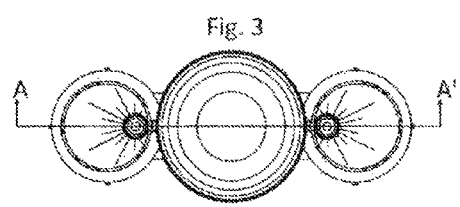

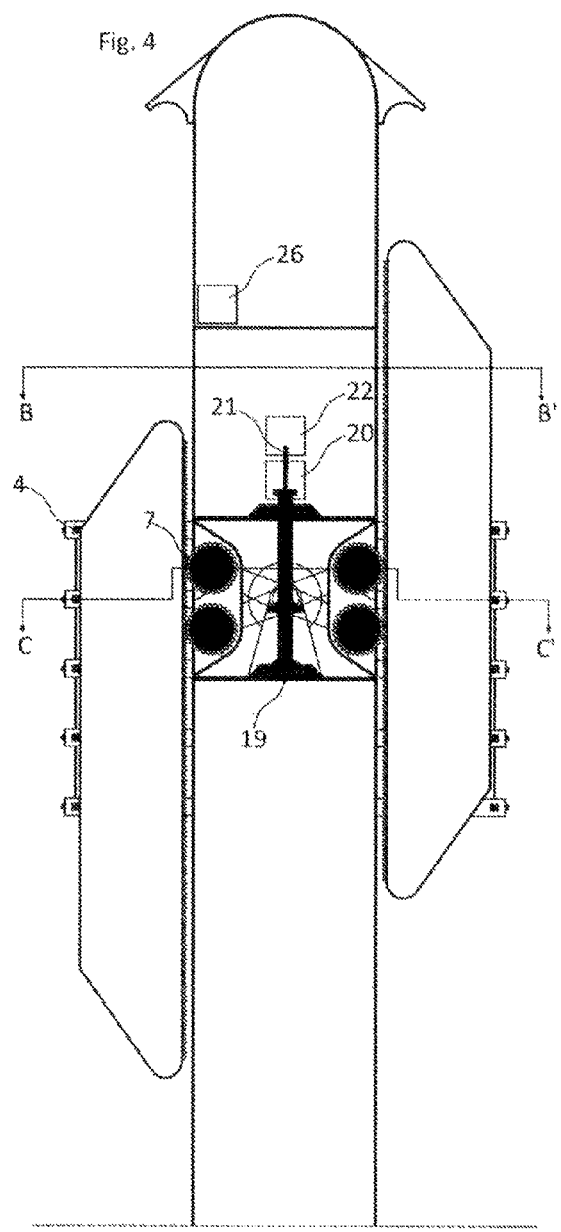

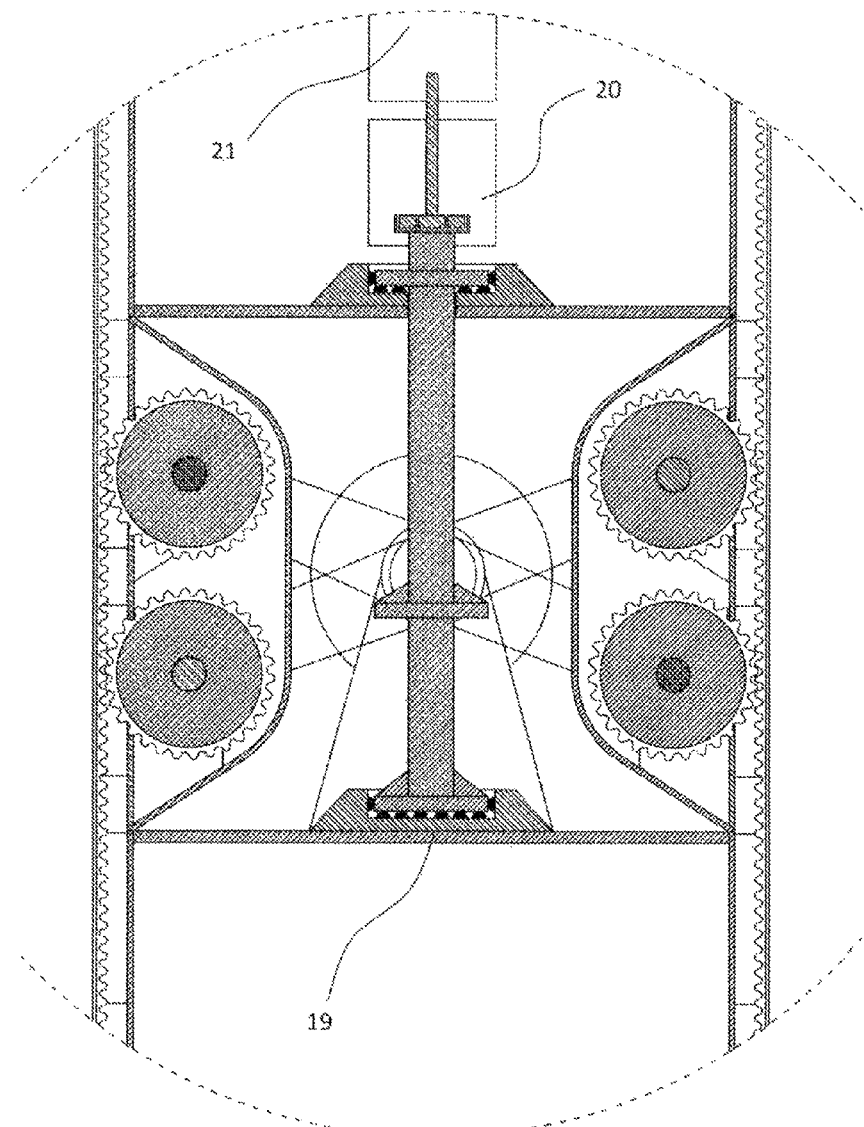

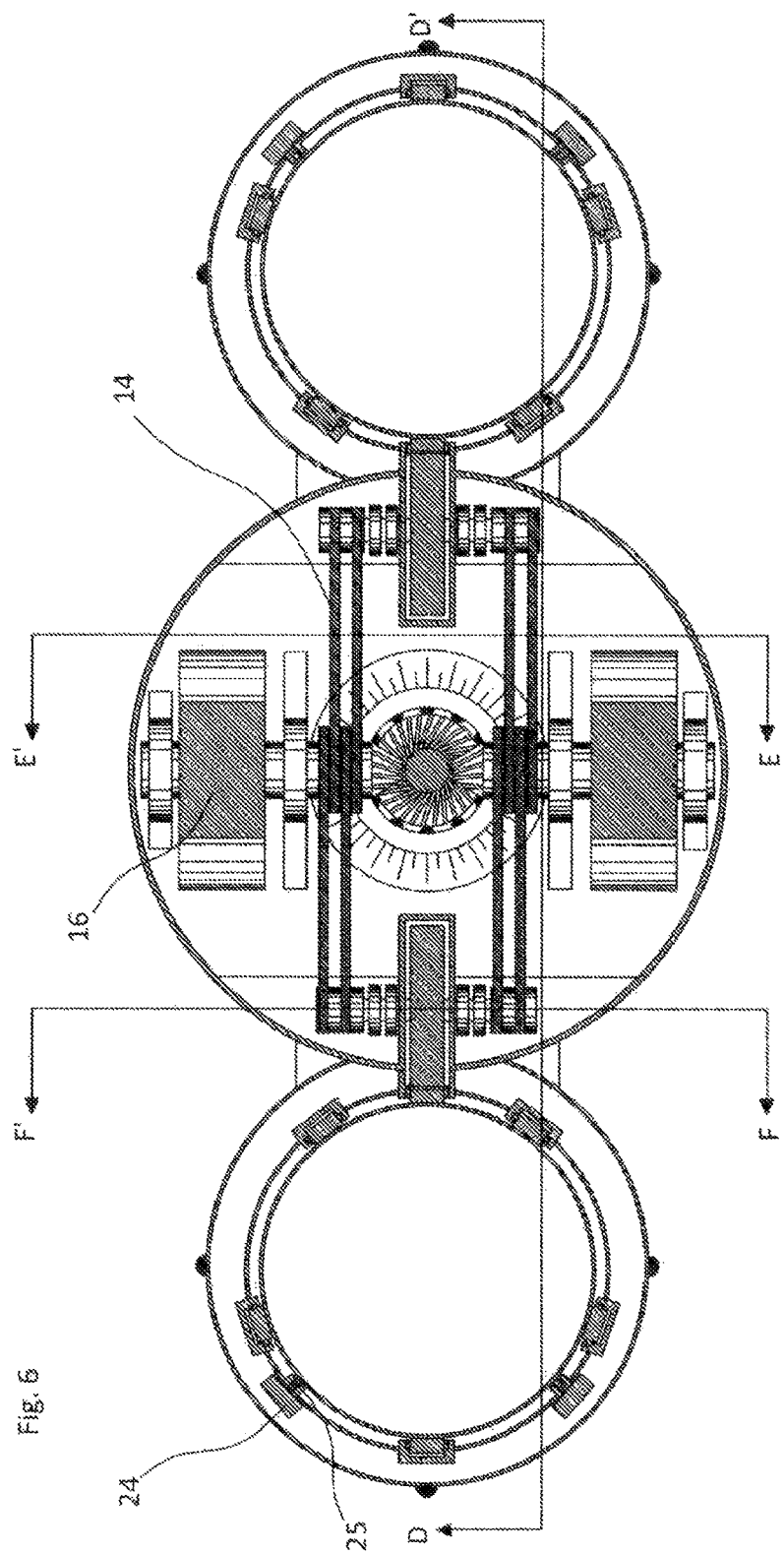

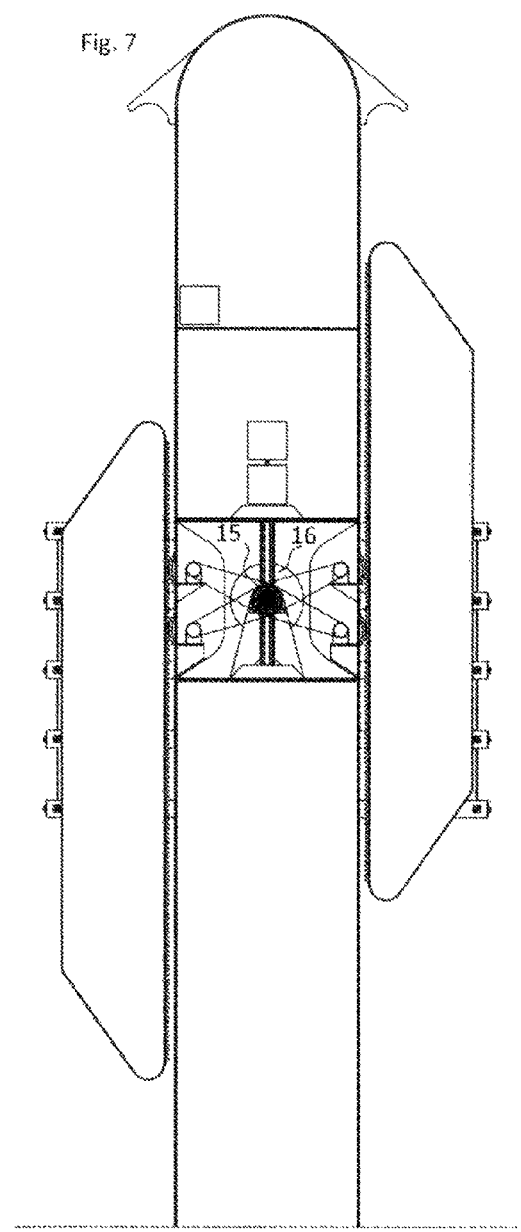

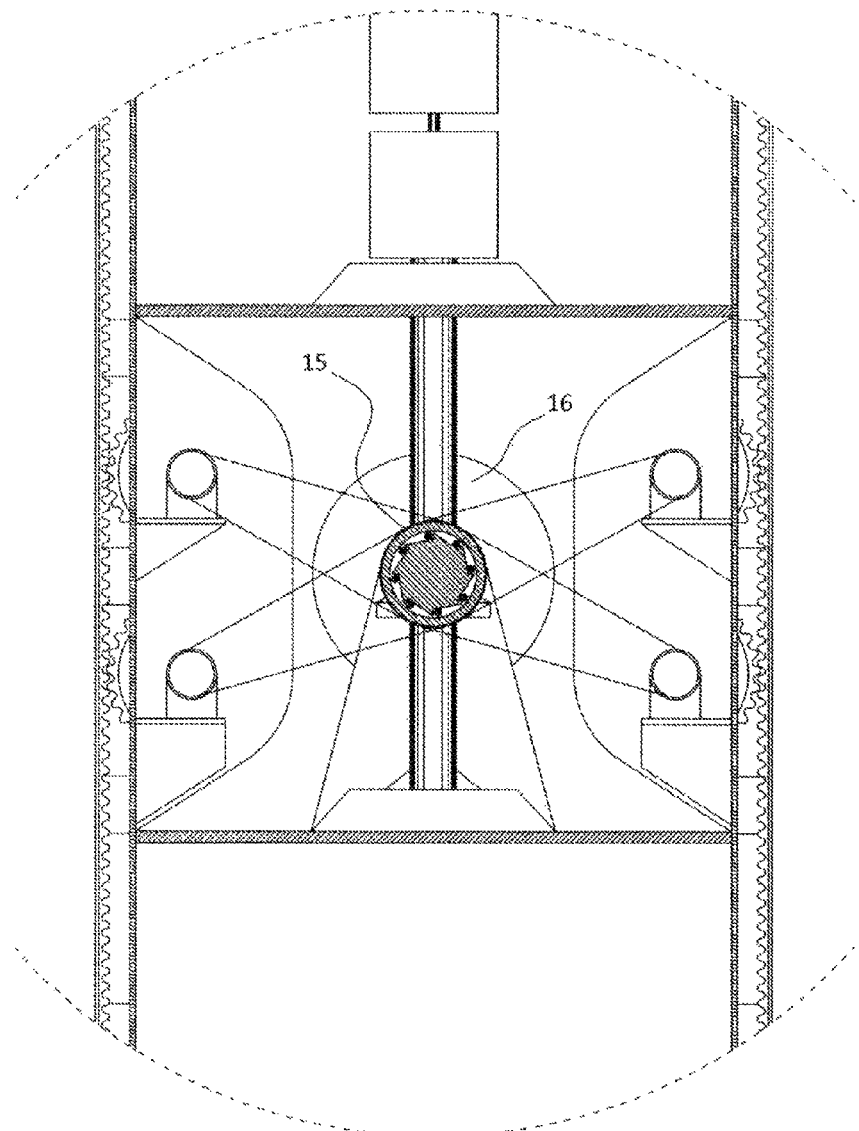
Fig. 7.1

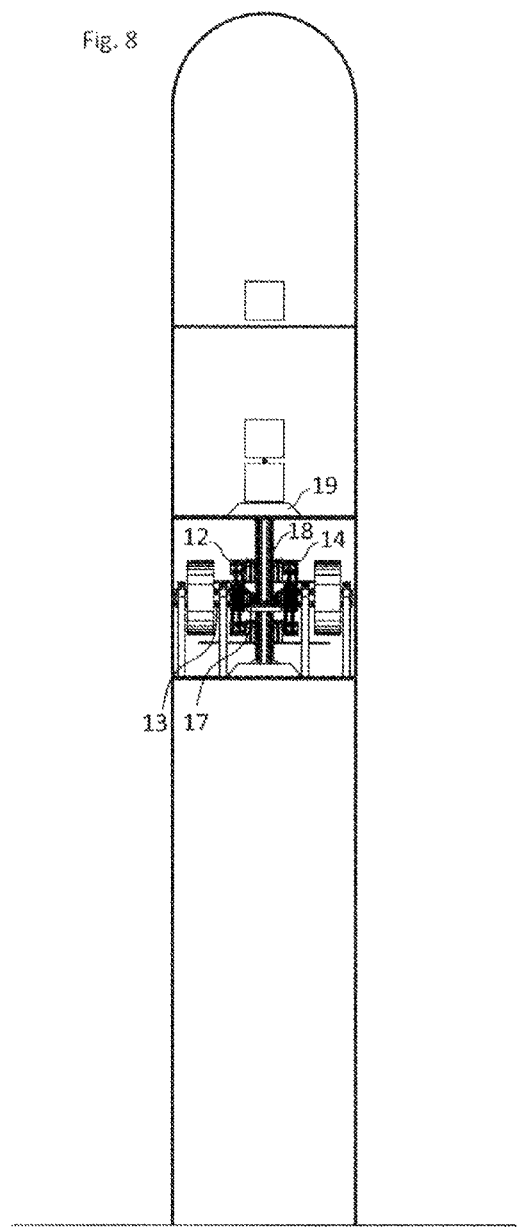

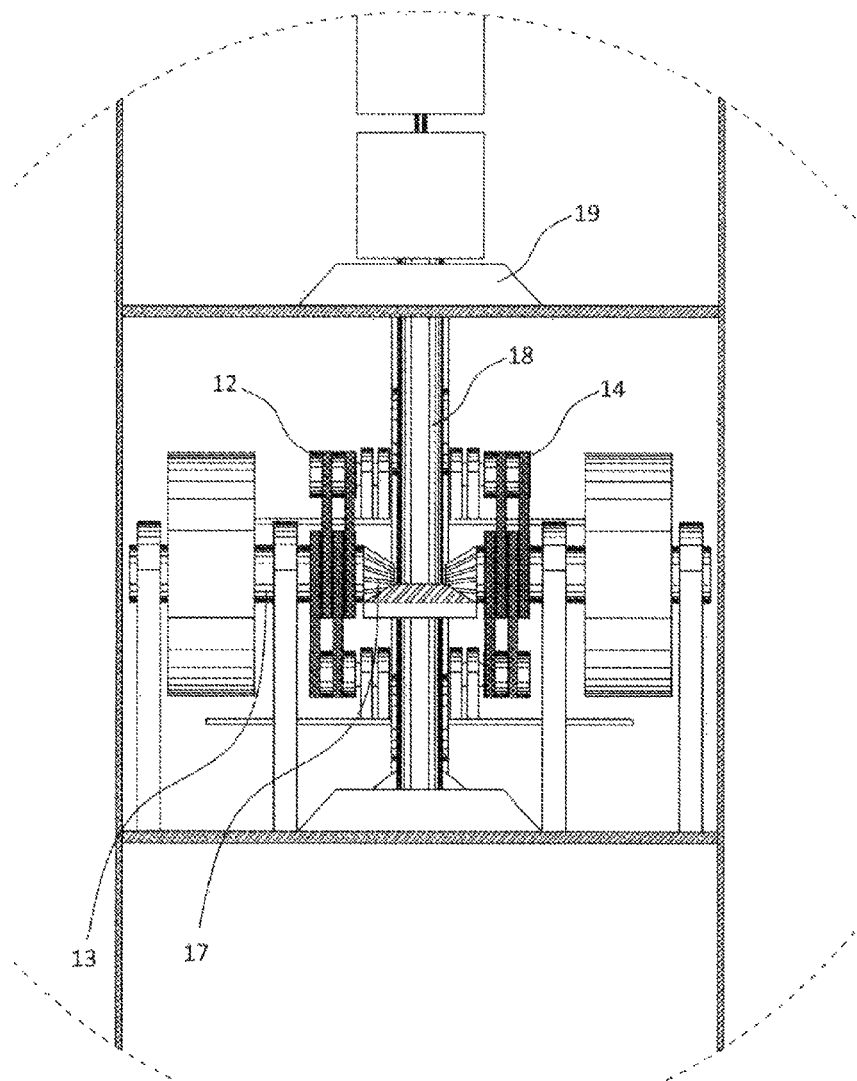
Fig. 8.1

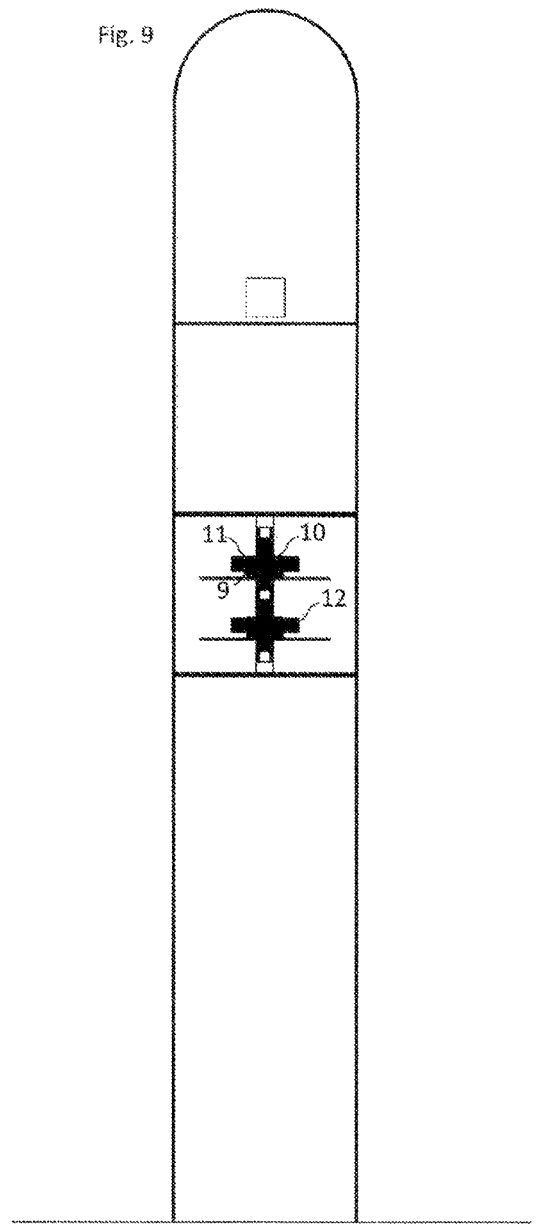

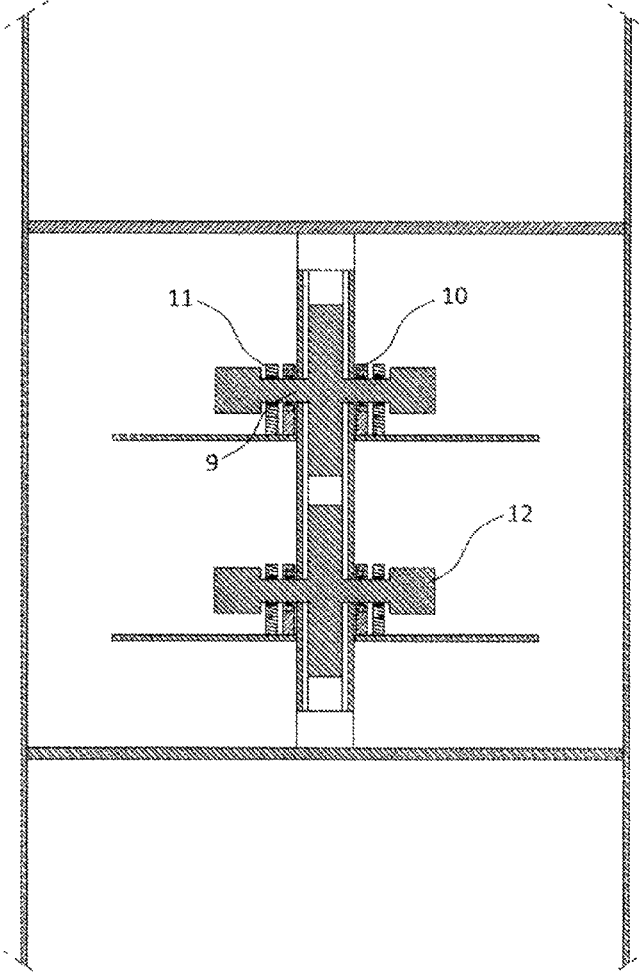

METHOD AND DEVICE FOR THE CAPTURE OF WAVE POWER

CROSS-REFERENCE TO RELATED APPLICATIONS AND PRIORITY

This patent application claims priority from PCT Application No. PCT/ES2021/000009 filed Mar. 3, 2021, which claims priority from Spanish Patent Application No. P202000128 filed Aug. 28, 2020. Each of these patent applications are herein incorporated by reference in their entirety.

FIELD OF THE INVENTION

The invention falls within the technical field of renewable power, more specifically in the capture of the power from waves of seas and oceans, also known as wave power.

BACKGROUND

The "waves" are the highlighting of the continuous action of the wind on the surface of the oceans and open seas. They have the particularity of moving over long distances, in exchange for a minimum loss of power, so the wind that originates them can be from the same place where the power exploitation is carried out or very distant from same.

Currently, wave power capturing techniques are being developed at a slower pace than other existing ones for the capture of renewable energies such as wind and solar power. The fundamental reason is the high cost of both construction and maintenance, in relation to the power that they are currently capable of capturing from the waves. For this reason, all efforts to make this clean and inexhaustible power generation technology more attractive must be aimed at increasing the ratio between Absorbed Power and Total Cost.

There are numerous technologies for exploiting wave power. Their classification can be carried out according to the criteria of different authors and the following variables: location, size and orientation, power extraction and capture principle. Therefore, these would be:

According to their Location;
a) On the coast or on-shore: the device is supported, either on the seabed or on a basin. The facilities are more easily built, installed and visited, especially for maintenance, although they have as a counterpart that they are more visible to the public.
b) Near the coast or near-shore; They are normally found at depths between and 25 metres, and can be either resting on the seabed or floating.
c) Outside the coast or off-shore: they are located at depths greater than 40 metres, and can be both submerged and floating. They have the great advantage of producing a greater amount of electrical power and having less visual impact from the coast, but their counterpart is having worse access for carrying out maintenance work.

According to its Size and Orientation:
a) Timely absorbers: these are devices that have a small size compared to that of the incident wave. They have a cylindrical shape, and therefore are indifferent to the direction of the incident wave. They capture the power not only of the incident wave but also that of a more or less close environment. Their disposition at sea is usually grouped in a row.
b) Attenuators: they are placed parallel to the direction of advance of the wave, being long devices such that they extract power progressively and on both sides. They are less exposed to damage and to anchoring than those discussed below.
c) Terminators or totalisers: they are placed perpendicular to the direction of advance of the waves, that is, parallel to the wave front. Their goal is to try to capture the power in one go.

According to power Extraction:
a) Floaters: the waves move the devices that are floating on the surface of the water, resting on a submerged mass or anchored to the seabed,
b) Tanks: these are a series of elements that are filled with seawater.

Subsequently, the water returns to the sea again, previously driving a turbine.
c) Rafts or pontoons: are those devices that exploit the relative movement in relation to the waves,
d) Pneumatic: with the movement of the waves, air is compressed and decompressed, this being intended to drive a turbine.
e) Mobile-articulated devices: they move with the waves acting on a hydraulic motor.

According to the Capture Principle:
a) Oscillating water column (OWC) This is a device made up of a chamber open at the bottom where seawater enters, thrust by the force of the waves, such that it compresses air, driving a turbine. The emptying of the chamber also allows the generation of electricity.
b) Bodies activated by waves: these are devices that move by the action of waves, relatively between two bodies, or absolutely between a body and a fixed reference.
c) Overflow systems: consists of the existence of a tank above the level of the sea water surface, which is filled by the action of the waves, such that when it is emptied it moves a turbine that is intended for electric power generation.

According to its Position relative to the water:
a) Fixed or floating: those that are floating on the surface of the sea water.
b) Semi-submerged: are those that are below the surface of the sea water, discontinuously or continuously (referring to time), partially or totally (referring to the portion that protrudes above said surface).
c) Submerged: all those devices that are always below the surface of the sea water.

All these devices that attempt to absorb wave power by activating mechanical, hydraulic, pneumatic elements, etc. and that end up driving an electrical generator, always do so under the parameters or characteristics of the waves that pass through them, i.e., their wavelength, period, height, etc. That is, all these devices attempt to capture the kinetic energy of the waves.

Therefore, a buoy that rises and falls on the passage of a wave, does so at the speed that the wave rises and falls. The air that is compressed by the rise in sea level inside a chamber, does so at the speed with which said wave rises through the inside of said chamber. The pneumatic device that is compressed when a wave rolls over same, does so as the wave increases in height and is decompressed as the wave recedes, etc.

Another drawback that is found on the capture of wave power, are the harsh weather and marine conditions that the devices have to face, which causes a very high cost in maintenance and repair of elements since many of the known devices have elements highly exposed to the surge such as the same buoys, pulleys, cables, counterweights, mechanisms, etc. In order to combat these harsh conditions, highly strong and heavy structures are required, a circumstance that is detrimental to the acceleration experienced by their capture elements and therefore, the speed they reach is greatly reduced, mainly due to the manner in which they operate, explained in the previous paragraph. Many devices, under such circumstances, immobilise the device or even move it into the depths of the sea to protect them, preventing them from operating and therefore losing many hours of operation at times when more power is available.

Moreover, also depending on the design, many of the existing devices have the power generation elements under water, which also generates very high installation and maintenance costs.

Another of the problems these devices encounter is having to adapt to irregularities in the amplitude, phase, and direction of the waves, which makes it difficult to obtain the maximum efficiency of the device across the entire excitation frequency range. Likewise, they have the difficulty of coupling the slow and irregular movement of a wave (frequency, approximately 0.1 Hz), with the higher excitation frequency that electrical generators normally require (approximately 500 times higher).

An added problem for this type of device is that in the first phase of power capture, hydraulic and/or pneumatic means are used, which must subsequently transform the power captured into mechanical means and that these, in turn, will have to transform it into electric power, dissipating a lot of power throughout the process.

For all of the above, the objective of the new method and device is to try to make it operate optimally and efficiently in the face of any type of surge, adapting to all its exposed variables and solving each of the aforementioned drawbacks.

SUMMARY OF THE INVENTION

Embodiments of the present disclosure provide a system and method for a wave power generating device. Briefly described, in architecture, one embodiment of the system, among others, can be implemented as follows. A wave power generating device comprises capture elements configured to allow the passage of the waves therethrough, characterised in that the device also comprises: a principal structure which in turn comprises stabilising columns wherein the capture elements are inserted; and primary gear assemblies. The capture elements are configured to transfer, with their movement, the force and speed of the waves to the primary gear assemblies of the principal structure. The primary gear assemblies comprise an elongated shaft that goes through support bearings that support the elongated shaft. A final crown is configured to transmit the torque of forces to an accumulator shaft directly or by means of a number of transmission means, wherein the accumulator shaft is coupled by means of one primary gear assembly to a slow shaft. The slow shaft is supported on bases comprising bearings, which, in addition to supporting the weight of the slow shaft, maintain the correct alignment of the slow shaft, wherein the slow shaft is coupled to a gearbox which increases the rotation speed of a fast shaft intended to produce the movement of an electrical generator.

BRIEF DESCRIPTION OF THE DRAWINGS

To complement the description that is being made and in order to help make the features of the invention more readily understandable, a set of drawings is attached as an integral part of said description wherein, for illustrative and non-limiting purposes, the following has been represented:

FIG. 1 shows a front view of the device of the invention according to the preferred embodiment.

FIG. 2 shows a side view of the device of the invention according to the preferred embodiment.

FIG. 3 shows a plan view of the device of the invention according to the preferred embodiment.

FIG. 4 shows a cross-section of the device of the invention according to the preferred embodiment through section AA' of FIG. 3.

FIG. 4.1 shows an enlargement of the mechanisms of FIG. 4.

FIG. 6 shows a cross-section of the device of the invention according to the preferred embodiment through section CC' of FIG. 4.

FIG. 7 shows a cross-section of the device of the invention according to the preferred embodiment through section DD' of FIG. 6.

FIG. 7.1 shows an enlargement of the mechanisms of FIG. 7.

FIG. 8 shows a cross-section of the device of the invention according to the preferred embodiment through section EE' of FIG. 6.

FIG. 8.1 shows an enlargement of the mechanisms of FIG. 8.

FIG. 9 shows a cross-section of the device of the invention according to the preferred embodiment through section FF' of FIG. 6.

FIG. 9.1 shows an enlargement of the mechanisms of FIG. 9.

DETAILED DESCRIPTION

Figure 5:
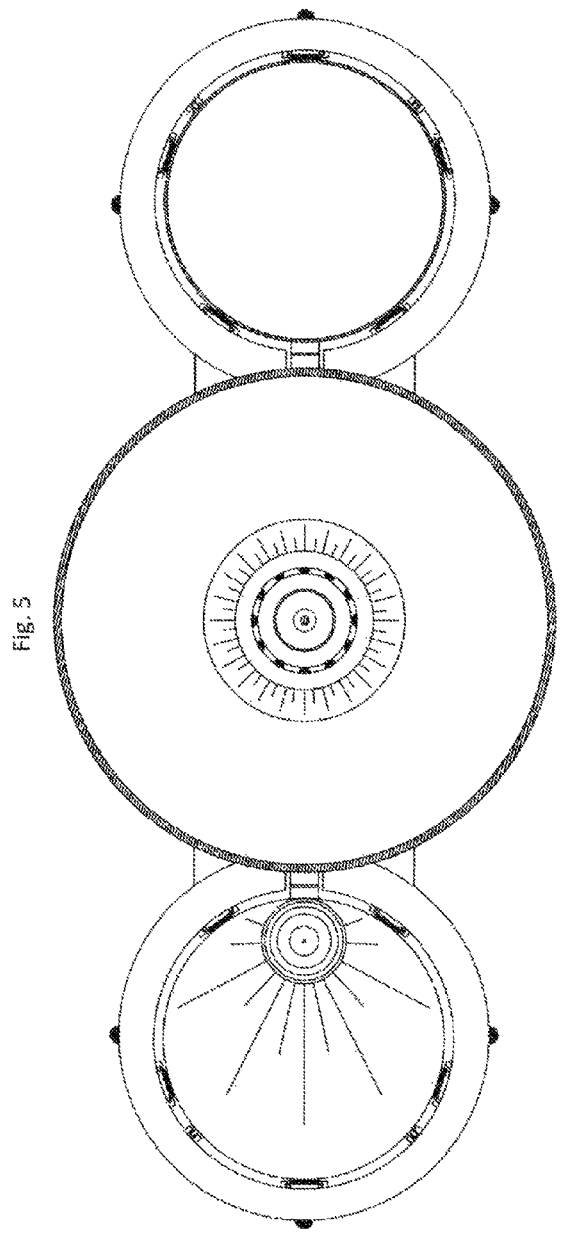
FIG. 5 shows a cross-section of the device of the invention according to the preferred embodiment through section BB' of FIG. 4.

The invention relates to a novel method and device for capturing wave power and subsequent conversion into electrical power, capable of increasing the power absorbed compared to current devices, exploiting the potential energy of each wave instead of its kinetic energy, transferring same to the capture elements (floats, buoys, etc.) and developing the movement thereof with greater power, thus increasing electric generation and therefore the profitability of the installation.

Theoretical Foundations

As the laws of physics point out, the Work (W) of a force applied to any body is obtained from the product of the Force (P) component in the direction of movement times the Displacement (d) of said body, that is to say:

$$W = F \cdot d$$

In the same way, physics defines Power (P) as the Work (W) generated per unit of Time (t), having:

$$P = W/t = F \cdot d/t$$

If we continue advancing and look at the previous formula, Displacement (d)/Time (t) equals speed (v), so we would also have the expression:

$$P = F \cdot v$$

If we identify the previous quantities in the methods and techniques for capturing wave power, for example, in a capture element consisting of a buoy that is displaced with the movement of the waves, we have that:

Displacement (d) corresponds to the Wave Height (H), which will ultimately be the travel taken by the capture element in the rising and falling thereof.

Time (t) corresponds to the time elapsed since the capture element passes from the highest to the lowest portion thereof and vice versa.

rising Force (P) substantially corresponds to the Thrust (E) experienced by the capture element due to having a submerged portion and the falling Force (F) corresponds to the Weight (P) which is usually equal to half its volume filled with water, thus achieving that the Work (W) of rising and lowering the capture element is identical, and is given by the following expression:

$$W = E \cdot H = P \cdot H$$

In this way and approximately, it could be said that the capture element develops its Displacement (d), maintaining the Thrust (E)=Weight (P) equilibrium.

However, observing the formulation, it follows that the greater the Force (F) and the Displacement (d) and, in turn, the lesser the time (t) during which said displacement occurs, the greater the Power (P) generated, this being the fundamental objective of the novel method and device described in this document.

Continuing with the example of a surface capture device using buoys (capture element) and focussing on the object of the present invention, the way to increase the Thrust quantity (E) in the rising movement of the wave, would be causing the buoy to increase its submerged volume as the wave approaches, thus breaking its Thrust (E)=Weight (P) equilibrium, thus feeding the force acting on the buoy. In this way, the potential energy of the wave (in this case negative) is induced in the buoy.

In the opposite direction, to reduce the Thrust (E) quantity in the falling movement, we will again break the Thrust (E)=Weight (P) equilibrium leaving the buoy suspended while the wave is falling, once again increasing the force acting on the buoy as the wave falls.

The other quantity that we need to increase is the speed (v) during the displacement (d), that is to say, we must make the buoy move in a rising and falling direction faster than the speed with which the wave passes from its edge to its valley and vice versa.

This is achieved by increasing the force acting on the buoy, a process described in the previous paragraphs, thus increasing the acceleration (a) with which the buoy will start its movement and which will result in an increase in its speed. We have the following formulas:

$$\Sigma F = m \cdot a \ y \ Vf^2 + Vo^2 = 2 \cdot a \cdot \Delta I$$

It follows therefore that the greater the summation of forces (IF) and having a constant mass (m) (that of the buoy), the greater the acceleration (a). And consequently, the greater the acceleration (a), the greater the final speed (Vf) that the buoy will reach in its displacement ($\Delta I$), starting from its rest situation (Vo).

Therefore, the novel method and device focusses on the manner and time in which the capture elements (floats, buoys, etc.) interact with the waves, in the morphology of said capture elements oriented to increase the power captured and minimise friction during its displacement, in the regulation and/or power storage devices, as well as in the location of the mechanical, hydraulic and electrical elements seeking to minimise the inspection and maintenance costs of said equipment.

The novel method described herein focusses on exploiting the maximum potential energy of the waves on their passage through the power generating devices, making the movable or capture elements (buoys, floats, etc.) acquire said potential energy to subsequently release it and transfer it to the device.

Likewise, it intends to maximise the excess elevations and excess depths with respect to the high and low levels of the waves that the capture elements experience in each movement, and the reached level of which is used in the next movement, generating more imbalance and a greater travel.

The way in which the novel method achieves that the capture elements acquire the maximum potential energy of the waves, is causing the movement of said capture elements to be offset with respect to the rising and falling movement of the waves, preventing them from replicating them simultaneously, thus breaking the equilibrium between the Thrust (E) and Weight (P) forces, generating the maximum difference between them. For this, capture elements long enough to cover at least the height of the wave chosen as the design wave of the device will be used, in addition to the heights of the excess elevations and excess depths generated in each displacement, so that the capture element is never fully submerged or fully emerged on the passage of the next wave, maximising and minimising the Thrust (E) values.

This must be so because a capture element, once it has been totally submerged, would no longer generate Thrust (E) even if the wave continues to gain height. The same thing happens in the opposite direction, once a capture element is totally emerged, it will no longer decrease its Thrust (E) even if the wave continues to lose height.

In order to offset the movement, blocking pieces of equipment are used to prevent the displacement of the capture elements while the waves are gaining or losing height as they pass therethrough. The appropriate time for driving and/or releasing the blockage of the capture elements is at the instants in which the waves are close to their highest areas (edges) and/or their lowest areas (valleys), maximising the potential energy acquired and subsequently released.

This method also exploits the maximum displacements acquired by the buoy until it stops, since the efforts generated are added to the next movement. By way of an example, when the buoy falls hard and submerges to a stop, the brakes are activated as soon as the device detects that the buoy starts rising, this submerged volume generated by the fall speed will be added to the submerged volume caused by the next wave, considerably increasing the force in the next rising movement.

Therefore, maximising said additional displacements is another of the objectives sought with the novel method and for this, we intend that, once the capture element has reached its point of equilibrium (Thrust (E)=Weight (P)) in any of the directions, all its available kinetic energy is transformed into potential energy, so we must release or exempt the capture element from any type of transmission of efforts. We will achieve this in an optical way, for example, with the combination of the use of freewheels and flywheels.

The above process would be as explained below. When the capture element reaches the mentioned point of equilibrium, for example, in the rising movement, it does so with the maximum speed generated, and which, at least, will be the one with the flywheel of the device. From this moment, the Weight (P) begins to be greater than the Thrust (E), and therefore, an acceleration in the opposite direction to the movement will begin, so the capture element will begin to slow down. As the flywheel continues to rotate, the freewheels ensure that the capture element no longer delivers power to the device, slowing it, and therefore, all its kinetic energy at this instant can be transformed into potential energy to be used in the next movement.

Other advantages of this method is that we also ensure that no power of any wave that drives the device is lost. Because the accumulator shaft, at any given instant, will always be rotating at the speed that the capture elements have already transmitted thereto in previous waves and because these always begin their movement starting from rest, the speed of the freewheel must reach the rotation speed of the accumulator shaft again so that there is transfer of power to the device again.

While this does not happen, two phenomena are taking place. The first of these is that if the accumulator shaft with its flywheel coupled, are rotating at high speed and this is such that the freewheel of a number of the capture elements is not capable of reaching it, it is a sign that optimal electric generation is taking place through the power stored in the flywheel. The second phenomenon, therefore, is that the potential energy available and released in the capture element is only used, until the speeds are equalised, to be transformed into kinetic energy, which will translate into a subsequent and greater excess elevation and/or excess depth to use in the next movement. For this reason, the calculation of the excess elevations and excess depths for the design of the capture element must be carried out in the event that the capture element does not deliver power to the device.

Through this novel method, we were able to greatly increase the force and speed with which the capture elements move compared to how they do when they are "free" without any type of blockage and replicate the movement of the waves.

The following drawings are attached illustrating the "vertical" position that the capture element would have on the passage of a wave under the operating conditions of the current devices and under the novel method explained above. The first drawing corresponds to the situation of Equilibrium between the Thrust (E) and Weight (P) Forces. The second drawing shows in the shaded area the volume that remains emerged and submerged that generates the imbalance between the forces. The third drawing also corresponds to the situation of imbalance generated by the novel method, but also reflecting the additional volume generated by the displacements produced by the inertia of the capture element until it stops (striped area).

The advantage of this method is the ease of adaptation at all times to the characteristics and parameters of the surge (wave height, speed, length, period, direction, etc.), being programmed under the criteria that optimise the capture, and for this, there will be a monitoring and control system that will have programmed different ways of operating depending on the existing surge.

Therefore, any device can work under different operating regimes such as; that it be totally free (let's say according to the style of current devices); that the blockages work only during the rising movement, generating a more explosive movement if the mass of the buoy is very small; that the blockages only work during the lowering movement for which heavier buoys would be of interest and that the blockages work in both directions as explained above, etc.

Another way of operating would be for the buoy, being at its lowest portion and anchored, to be released without giving any power to the device, so that it reaches a greater height due to the great acceleration generated, and that from the height reached it begins to fall now delivering power to the device and vice versa. For this operation it would only be required to modify the orientation of the freewheels and the connection of the gear assemblies.

Among the different modes of operation, we could also highlight that the release of the different capture elements can be programmed when they are suspended in the upper portion of the movement, so that, with long period waves, there is a delay between them so that their fall is distributed over a certain period of time or, on the contrary, that they are all released at the same time, even though they have arrived at different moments, thus generating a more powerful impulse.

The monitoring and control system will also be able to decide which capture elements to put into operation, depending on the height of the waves, their direction, their diameters and masses.

Due to the foregoing, it can be said that with this method it is possible to increase the power generated in two ways and simultaneously. The first is due to the increase in potential energy induced in the capture element which, by never being totally submerged or emerged, will always be the maximum possible. The second, by increasing to the maximum possible the travel during which the capture element is being accelerated.

With the combination of the two phenomena, we achieve that the acceleration is the maximum possible, and therefore the speed will also be the maximum possible when the point of equilibrium is reached and, in turn, susceptible of being exploited during the next movement.

Due to the great acceleration achieved and the fact that the length of the capture element is such that it is never submerged, also ensuring that the force of friction is minimal, we improve the efficiency of the method, since we guarantee that the capture element will emerge in the highest portion of the wave, despite having had the capture element held until the wave practically reaches its highest area or even having reached it. Otherwise, the capture element should be released long before the wave reached its highest point (losing power), calculate the rising speed of the wave (difficult), to synchronise the accelerated movement of the capture element with that of the wave, to make it coincide that the capture element reaches the point of equilibrium when the wave is reaching its highest area (difficult and inefficient), taking into account the force of friction generated by having to displace masses of water and therefore, also losing speed in the movement generating less power (inefficient) and getting less excess elevation and excess depth for the next movement (inefficient).

For a better understanding of the novel method, and to see an exemplary application, we will rest on the novel device, which is also an integral part of the present patent application.

Explanation of the Device

The novel device is configured to work under the terms of the method explained in the previous paragraphs, whereby the movement of the capture element is offset with respect to the movement of the wave by blocking same, the capture element acquiring its potential energy.

The novel device is made up of a principal structure that will house all the pieces of equipment and will absorb the efforts caused by the surge, so that all the sensitive elements will be protected, saving on operation and maintenance work. It will have different accesses and work chambers to facilitate the assembly and maintenance tasks, the installation of the different pieces of equipment, etc. It will support as many capture elements as are designed, these being able to be coupled to the same common shaft or in an individual and isolated manner.

This structure, in addition to being installed independently by means of the different systems currently known, also guarantees a simple implementation in existing marine structures, such as wind turbines, platforms, etc. exploiting all the infrastructure (cables, substations, structures, etc.). Especially relevant is its easy installation on the mono-piles of the wind turbines, since once the mono-pile is nailed, it is only required to insert the wave power generating "module" and the wind turbine column is placed on the top of the module.

The principal structure has fixed stabilising columns attached, the function of which is to protect the buoys, confining them and directing their vertical movement facilitated by a series of bearings. Due to the protection they confer, lighter capture elements may be installed, if they were to be so designed, since they generate very large accelerations, even greater than the acceleration of Gravity, when they are submerged.

The degree of protection of said columns will be designed based on the chosen location, characteristic parameters of the surge in the area, and without losing sight of cost optimisation, since they can be designed very closed or dense (more expensive), very light (cheaper), having gradual protection (for example, more closed at the upper portion and more open at the lower portion), and if many capture elements are designed in the device, it could even be cheaper to design a single cylinder having a larger diameter than that of the principal structure, said cylinder covering all the capture elements. The crowns will be designed, therefore, based on the number and geometry chosen for the capture elements, adapting to them at all times.

Due to these fixed structures, intended to receive and absorb the efforts caused by the surge, power generation can be carried out even under the most adverse weather conditions, which is when there is more power available, without having to stop its operation as many devices must do so as not to jeopardise their integrity.

These columns will have wider crowns for the installation of cables and auxiliary elements such as bearings, braking systems, surge parameter detection means, etc., being protected from the sea at all times. These crowns will have a number of external gates for the maintenance and replacement of said elements.

The buoys are coupled inside the stabilising columns, buoys which are designed such that when they are in equilibrium (without the action of the waves) they have a large portion of their body emerged from the water, so that they acquire the greatest possible submerged volume on the passage of the waves therethrough, thus acquiring their potential energy. In the same way, they will be designed with a large submerged volume that will be intended to reduce the thrust force when they are suspended and the waves drop in height. For this reason, the buoys will be designed based on the area where the device is to be installed, optimising its cost based on the characteristic parameters of the surge in that area, even adapting to the tidal stroke of the location.

As explained in the previous paragraphs, the object of the invention is to maximise the capture of power coming from the waves, exploiting their potential energy, transferring it to the capture elements. For this reason, these elements will be designed so that once they are slowed down at their highest and lowest portion, of any cycle, they generate the maximum offset between the Thrust force (E) and its Weight (P). This is achieved by causing, as the wave gains height, the submerged volume of the capture element to also increase and vice versa, that is to say, that as the wave lowers there is an increase in the emerged volume.

Moreover, due to the excess elevations and excess depths that will be generated in the capture element when the device is in operation, the design height of the capture element must also take into account said excess elevations and excess depths, to cause that, on the passage of the next wave, same generates again the maximum submerged and emerged volume on the capture element.

This design is especially important, since, if it is not done in this manner, the excess elevations and excess depths will only generate more travel during which the capture element is accelerated, but will not produce an increase in the potential energy absorbed and therefore acceleration in the movement. Designing the capture elements under this criterion, both phenomena are exploited, that is to say, more travel with more acceleration.

For all of the above and to guarantee maximum power capture, the capture element must have a design height that takes into account, firstly, the wave height of the location (the height chosen for the design), secondly, the excess elevations and excess depths produced during operation and finally and optionally, an additional safety protection. In short, it is intended that the capture element never remains, for the design wave height, totally submerged or emerged, because from this point on, there would be no increase in potential energy.

By being able to arrange capture elements of different diameters and weights on the same device, we are able to perfectly adapt to the variability of the surge. This functionality will be strongly enhanced with the use of the monitoring and control system.

The advantage of this device is that by leaving the capture element completely submerged and emerged it allows a lot of potential energy to be accumulated, and the fact that the mass is heavier and more resistant to the ravages of the surge is not a drawback, since the acceleration produced is very high and guarantees that the capture element reaches its point of equilibrium, while the wave is still in the range of its highest area. In addition, since it is never totally submerged, it does not have to displace masses of water when it moves upwards, greatly reducing the force of friction, and maximising the production of electric power by obtaining greater speed, generating greater excess elevation, etc.

They will be implemented such that their movement is, as far as possible, totally or substantially vertical, thus avoiding losses due to having to displace masses of water. Its ends will have an aerodynamic shape to minimise friction during displacements and, optionally, an asymmetric cone shape to press the buoy towards the principal structure, specifically against the gear assemblies. The buoy will have a vertical rack along its entire length, in the area of contact with the primary gear assemblies located in the principal structure. In this way, the capture element will provide the required rigidity to said rack by reducing its buckling length, also managing not to oversize the structure by not having to cover the great height of the capture element in addition to the great length of the rack. This design also ensures that the rack and primary gear assembly are continuously cooled by the water level that is reached in each wave.

These elements may or may not have a symmetrical shape with respect to the sea level, identical or different geometries can be defined for the submerged and emerged portion, depending on the desired design and operation. Similarly, and regardless of the length of the capture elements, it can be designed with different cross sections, whether cylindrical, circular trapezoids, elliptical, etc.

This capture element or buoy will have a number of structural reinforcements inside, mainly in the area of longitudinal contact with the stabilising bearings. Additionally, a number of guides will be incorporated along the entire length thereof that will help maintain its alignment, in turn forming part of the blocking system.

With the optionally proposed design, in case of breakage of any capture element, it will be very easy to replace it by only having to remove it from its upper portion and inserting the new capture element from above, locking it with the primary gear assembly.

The buoys transmit their vertical movement to the primary gear assemblies. These gear assemblies are coupled to the principal structure through its central shaft which, in addition to being supported by the bearings that support its weight, goes through the main blocking system and incorporates a crown intended to transmit the torque to the accumulator shaft, either directly or through a transmission system (belts, chains, etc.), depending on the desired design.

The main blocking system is that which is intended to cause the buoy to be slowed and released, as explained in the previous method. For this, the device has a smart system that will be explained below. Blocking pieces of equipment consist of means or braking systems such as disc brakes, latches, wedges or similar, designed for the efforts to be supported.

This blocking system will also be programmed for emergency situations, strong surges, breaks, etc. that endanger the integrity of the device. It can also be manually or telematically driven at the required time for inspection and maintenance operations. In any case, and as previously mentioned, due to the protective crowns, the capture elements will be able to function perfectly under very adverse weather and surge conditions.

The device allows the arrangement of several primary gear assemblies (both in height and horizontally) to distribute the efforts applied by the rack, as well as for the sizing of the internal bearings, brakes, belts, etc. Through these gear assemblies, the transmission of the efforts of the capture element to the inside of the structure is achieved very easily, directly to the power-producing mechanisms, and in a totally sealed manner, thus avoiding inefficient transformations to intermediate hydraulic and/or pneumatic systems.

Continuing with the transmission of forces, the transmission elements (belts, chains, etc.) will rotate in one direction and another with the rise and fall of the buoy, so that they will be coupled to the accumulator shaft by means of a number of freewheel bearings (they transmit torque in one direction of rotation but not in the other), so that the transmission on the accumulator shaft is always in a single direction.

The accumulator shaft, which may be installed horizontally or vertically, depending on the desired design, is intended to receive the torque transmitted by the gear assembly, either directly or through the aforementioned transmission means (belts, chains, etc.). The aforementioned freewheel bearings will be installed on its shaft in one direction of rotation and the other, so that, during the rising movement of the buoy, part of the bearings transmit torque to the slow shaft and the other half does not, having the reverse process during the falling movement of the buoy.

The accumulator shaft has a flywheel or similar coupled, capable of storing kinetic energy and that serves to regulate the power transmitted by the waves during the periods of oscillation of the same as well as during the blocking times of the buoy. This accumulator shaft is connected to the slow shaft by means of the corresponding transmission means (gear assembly, belts, etc.). The accumulator shafts designed may have flywheels with different inertia to better adapt to surge conditions.

With the combination of the freewheels and the flywheel, we achieve the goal that the capture element transforms all its available kinetic energy when it reaches the point of equilibrium, into accumulated potential energy for the next movement, also ensuring that no power of any wave is lost, since, if at any time the speed of the capture element is less than that already available to the accumulator shaft, this speed will be used to generate potential energy that can be exploited for the next movement.

The slow shaft, which may also be vertical or horizontal depending on the desired design, will receive the input of as many accumulator shafts as are installed and will be supported on bases with bearings, which in addition to supporting its weight and favouring the rotation movement with the minimum loss of performance, will guarantee the positioning thereof. Depending on the desired design, the slow shaft can also function as a flywheel or power accumulator depending on its mass, diameter, etc., working independently or in parallel with the accumulator shafts. For this, for example, it may have free pinions on its shaft coupled with the toothed crown that receives the movement of the accumulator shafts, or directly from the primary gear assembly.

From this point on, the process of electric generation and its evacuation is similar to that which occurs in wind turbines, that is to say, that the slow shaft transmits its force and speed to a gearbox, increasing the rotation speed of the fast shaft intended to produce the movement of the electric generator. For the implementation of the method in the novel device, it will be equipped with smart tools made up, on one hand, of the main monitoring and control system that can be manually and/or telematically programmed, and on the other hand, of a number of detection devices for detecting the characteristic parameters of the waves and the movement of the movable portions of the installation which, acting as transducers, will emit the corresponding signals that will make it possible to govern the generation of power.

The main monitoring and control system (processor, microcontroller or similar) will use the signals received through the detectors for two main motions.

The first of these is to establish the operating regime at which the device will begin to work based on the established programming. For example, when the signals indicate that the surge is very small, it will establish a working regime without blockages, that is to say, leaving the buoy free. The monitoring and control system will also be able to decide which capture elements it puts into operation by controlling them and which ones are left released, depending on the wave height, its direction, the diameters and masses of the capture elements, etc. It will also be able to induce delays between the different capture elements when they are released from their highest position, exploiting longer wave periods, etc.

The second function will be, once the operating regime has been established, to give the corresponding orders to block and release the buoy, driving the brakes, depending on the surge signals and the movement of the movable portions of the installation. The means for detecting the characteristic parameters of the waves and the movement of the movable portions of the installation may be smart systems such as pressure sensors, movement sensors, auxiliary buoys, laser distance metres, etc.

Another of the objectives that we seek with this method and device is that, due to the great variability of the characteristics of the waves, the monitoring system is as simple as possible in order to increase its efficiency.

As an example, when the buoy rises delivering its power and wants to start the lowering movement, the movement sensors detect it and automatically activate the brakes, immobilising the buoy. When the pressure sensors detect that the wave is close to its valley, the buoy is released. When the buoy falls and sinks after having transferred its power to the device, it stops and begins to rise, the movement sensors detect this and block the buoy again, releasing it again when the pressure sensors detect that the next wave is reaching its edge.

To avoid false signals from small waves within a higher wave, which would reduce the effectiveness of the capture, a minimum rising and/or falling value of the wave can be established (for example, calm sea level), so that from these, the release and block signals are interpreted as correct.

With this method we manage to break the Thrust (E)=Weight (P) equilibrium already explained above, the capture elements acquiring the potential energy of the waves.

The competitive advantage provided by the novel invention is that it greatly improves the profitability of the capturing of wave power compared to currently existing devices, since on the one hand it manages to increase the power absorbed by exploiting the maximum potential energy of the waves and on the other hand, it makes it possible to have all the transmission and generation devices out of the water and totally unaffected by adverse weather and sea elements, with the exception of the capture element. This circumstance facilitates maintenance operations, saving costs as well as avoiding the breakage of the most sensitive components of the device.

The novel method and device can be adapted to multiple configurations by varying the number of capture elements installed, the number of shafts, etc., being able to be connected in series on marine platforms, the capture elements transferring all the power to a single slow shaft.

Regarding its implementation, it should be noted that it can be installed on basins, offshore platforms, ships, supported on the seabed or with floating technology currently used in offshore wind turbines. Another option is to exploit the same structures of the offshore wind turbines and offshore platforms as the principal structure, coupling only the capture elements and mechanisms, thus exploiting all their infrastructure and evacuation lines, making this technology considerably more profitable.

Another advantage of the novel method and device is the ability to work under different operating regimes depending on the existing surge at all times, thus optimising the generation of electric power.

Another advantage of the device is the possibility of placing the primary gear assemblies around and at different heights of the principal structure, making it possible to install more buoys and at different levels, thus increasing the power captured and better adapting to tidal strokes.

In light of the aforementioned figures, and in accordance with the adopted numbering, one may observe therein a preferred exemplary embodiment of the invention, which comprises the parts and elements indicated and described in detail below.

The novel device for capturing wave power has a principal structure (1), made up of two fixed stabilising columns (2) for protecting the buoys (3), where a number of bearings (4) are installed, specifically in their crowns (5).

This principal structure will house the rest of the pieces of equipment intended for electric generation, which will be described below:

Two capture elements or buoys (3) will be installed that will have a longitudinal rack (6) along the entire length thereof, in the contact area with the primary gear assemblies (7) located in the principal structure. The ends of the buoys will have an asymmetrical cone shape (8) and several longitudinal guides (25).

Two primary gear assemblies (7) will be installed for each buoy, which are intended to receive, in a first phase, the torque generated by the buoys. These gear assemblies have an elongated shaft (9) so that it can pass through the support bearings (10), the principal blocking device (11) as well as house a final crown (12), intended to transmit the torque to the accumulator shafts (13), by means of belts or chains (14). These belts will rotate in one direction and another with the rising and falling of the buoy, so that they will be coupled to the accumulator shafts (13) by means of a number of freewheel bearings (15).

The accumulator shafts (13) have a flywheel (06) capable of storing kinetic energy and used to regulate movement during the period of wave oscillation and buoy blocking. The accumulator shafts (13) are coupled by means of a bevel gear assembly (17) to the slow shaft (18), which will receive the input from the two accumulator shafts (13).

The slow shaft (18) is supported on bases (19) with bearings. This slow shaft (18) can also act as a flywheel depending on the desired design. This slow shaft (18) is coupled to a gearbox (20) which increases the rotation speed of the fast shaft (21) intended to produce the movement of the electric generator (22).

Pressure sensors (25) will be installed in the crowns (5) and movement sensors in the movable portions of the installation, which will send signals to the principal monitoring and control system (26), which will drive the operating regime and the blocking systems installed on the primary gear assembly (7).

In addition to the principal blocking system (11) indicated above, other complementary braking pieces of equipment (24) will be installed in the stabilising columns (2), specifically in their crowns (5). These braking pieces of equipment will press a longitudinal guide (25) installed on the buoy.

As can be deduced from the explanation of the novel method and device, the industrial application for the implementation of this method and device is fully guaranteed.

There are manufacturers of metallic and naval structures as well as an increasingly powerful infrastructure and provision of pieces of equipment for the transportation and installation of marine structures.

This industry would be intended to manufacture elements with a marked structural character, such as the principal structure with its crowns, buoys or parts thereof, gear assemblies, etc.

There is also a wide variety of manufacturers of mechanical, electrical and electronic components, involved in similar installations, with a multitude of interrelated mechanisms.

The use of industrial sensors is key in the development of the so-called Industry 4.0, being embodied in increasingly "smart" industrial facilities, making them increasingly efficient, which is why there are more and more companies specialising in this type of devices.

This industry would supply certain components of the device such as bearings, braking systems, belts and chains, gearboxes, pressure sensors, auxiliary buoys, laser metres and/or similar electronic devices.

In the same way, for the electric and generation portion, there are many companies specialised in the supply and installation of electrical components such as generator sets, evacuation power lines, whether marine or land, etc.

The increasingly growing need to increase the consumption of power from renewable sources is causing the proliferation of many specialised companies in the offshore wind power sector, the investment and infrastructure of which is increasing, thus making it possible to exploit synergies by making this novel method and device much more profitable, even exploiting part of the offshore wind power facilities such as its principal structure, electrical evacuation lines, etc.

Below, a list is provided of the different elements represented in the figures making up the invention:
1=Principal structure
2=Stabilising columns
3=Capture element
4=Bearings
5=Crowns
6=Longitudinal rack
7=Primary gear assemblies
8=Asymmetrical cone
9=Primary gear assembly shaft
10=Support bearing
11=Blocking device
12=Final crown
13=Accumulator shaft
14=Belts or chains
15=Freewheel
16=Flywheel
17=Bevel gear assembly
18=Slow shaft
10=Support bases
20=Gearbox
21=Fast shaft
22=Electric generator
23=Detection devices (sensors)
24=Complementary braking equipment
25=Longitudinal guide
26=Main monitoring and control system

The invention claimed is:

1. A wave power generating device comprising:
capture elements configured to allow the passage of the waves through said capture elements;
a principal structure which in turn comprises stabilising columns wherein the capture elements are inserted; and primary gear assemblies;
wherein the capture elements are configured to transfer, with their movement, the force and speed of the waves to the primary gear assemblies of the principal structure;
wherein the primary gear assemblies comprise an elongated shaft that goes through support bearings that support the elongated shaft;
a final crown configured to transmit the torque of forces to an accumulator shaft directly or through a number of transmissions, wherein the accumulator shaft is coupled by one primary gear assembly to a slow shaft;
wherein the slow shaft is supported on bases comprising bearings, which, in addition to supporting the weight of the slow shaft, maintain the correct alignment of the slow shaft, wherein the slow shaft is coupled to a gearbox which increases the rotation speed of a fast shaft intended to produce the movement of an electrical generator.

2. The device of claim 1 further comprising a main blocking system configured to govern the movement of the capture elements, blocking them, at least partially, at their high and low points, thus absorbing the potential energy of the waves.

3. The device of claim 2, wherein the main blocking system is configured to block the capture elements in their rising movement, in the falling movements or in both movements.

4. The device of claim 3, wherein the main blocking system is configured to block the capture elements in a upper position of the capture elements with regard to the stabilising columns and the main blocking system is configured to release the capture elements simultaneously or with a delay between the capture elements depending on a wave return period.

5. The device of claim 2 further comprising complementary braking equipment disposed in the stabilising columns, wherein the complementary braking equipment is configured to press a longitudinal guide disposed in the capture element, wherein the complementary braking equipment is also configured to ensure the alignment of the longitudinal guide.

6. The device of claim 2 further comprising a monitoring and control system of at least the main blocking system that is configured to govern the movement of the capture element and a detector configured to detecting the characteristic parameters of the waves and the movement of the movable portions of the device, wherein the monitoring and control system is intended to establish the operating regime of the device and to send the braking and release signals of the capture element depending on a programming established and the signals received from the detector.

7. The device of claim 6, wherein the monitoring and control system of at least the main blocking system is configured to establish a value of minimum falling and/or and a value of minimum rising of the wave, so that from these values, the monitoring and control system is configured to send release and blocking signals to the main blocking system.

8. The device of claim 5, further comprising complementary braking equipment disposed in the stabilising columns, wherein the complementary braking equipment is configured to press a longitudinal guide disposed in the capture element, wherein the complementary braking equipment is also configured to ensure the alignment of the longitudinal guide;
wherein the stabilising columns comprise crowns in which the detector for detecting the characteristic parameters of the waves, bearing systems configured to guide the capture element and/or the complementary braking systems are disposed.

9. The device of claim 1, wherein the capture elements comprise a longitudinal rack for the transmission of the movement of the waves to the primary gear assemblies.

10. The device of claim 1, wherein the capture elements are disposed, in use, with a part of their volume emerged in a state of equilibrium, in such a way that the capture elements generate the imbalance of acting forces when being submerged on the passage of the waves.

11. The device of claim 1, wherein the accumulator shaft comprises freewheels coupled to the accumulator shaft and configured to favour the rotation of said accumulator shaft in the desired direction, and a flywheel coupled to the accumulator shaft and configured to regulate the power production during a period existing in the waves, or alternatively, the slow shaft is configured to function as a flywheel or power accumulator working independently or in parallel with the accumulator shaft, receiving the movement of the accumulator shaft, or directly from the primary gear assembly.

12. The device of claim 1, further comprising kinetic energy accumulator elements connected to the capture elements by an alternator configured to alternate between the transmission and non-transmission of efforts from the capture element to the kinetic energy accumulator elements, wherein the kinetic energy accumulator elements are configured to accumulate an amount of kinetic energy not used in the device when an operating speed of the device is higher than a speed transmitted by the capture elements to the device.

13. The device of claim 6, further comprising pressure sensors and movement sensors disposed in the movable portions of the device, configured to send signals to the monitoring and control system, which is configured to drive the operating regime of the primary gear assemblies.

14. The device of claim 1, wherein the capture elements are configured to use one of the movements to transform their potential energy into kinetic energy without transferring power to the device, obtaining a displacement, to subsequently exploit it during the next movement but now transferring power to the device, or on the contrary, the capture elements are configured to transfer power to the device both in the rising and in the falling movements.

15. A method for the capture of wave power by a wave power generating device comprising:
   capture elements configured to allow the passage of the waves through said capture elements;
   a principal structure which in turn comprises stabilizing columns wherein the capture elements are inserted; and
   primary gear assemblies,
   wherein the capture elements are configured to transfer, with their movement, the force and speed of the waves to the primary gear assemblies of the principal structure;
   wherein the primary gear assemblies comprise an elongated shaft that goes through support bearings that support the elongated shaft;
   a final crown configured to transmit the torque of forces to an accumulator shaft directly or by a number of transmissions, wherein the accumulator shaft is coupled by one primary gear assembly to a slow shaft;
   wherein the slow shaft is supported on bases comprising bearings, which, in addition to supporting the weight of the slow shaft, maintain the correct alignment of the slow shaft, wherein the slow shaft is coupled to a gearbox which increases the rotation speed of a fast shaft intended to produce the movement of an electrical generator,
   wherein the method comprises the following steps:
      establishing which capture elements of the device will come into operation according to their mass and geometry and under what regime of operation, and based on the detected characteristics of the waves;
      driving of the main blocking system that will act on the selected capture elements, when the capture elements are at an upper position and a lower position with regard to the stabilising columns; and
      releasing the capture element from any type of transmission of efforts when the capture element reaches the upper position or the lower position again.

* * * * *